(12) United States Patent
Fried

(10) Patent No.: US 8,171,276 B2
(45) Date of Patent: May 1, 2012

(54) MINIMAL STARTUP MODE FOR PERFORMING MULTIPLE-REBOOT CONFIGURATION

(75) Inventor: Eric Phillip Fried, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 12/136,159

(22) Filed: Jun. 10, 2008

(65) Prior Publication Data

US 2009/0307475 A1 Dec. 10, 2009

(51) Int. Cl.
*G06F 15/177* (2006.01)
(52) U.S. Cl. ............................................. 713/2
(58) Field of Classification Search ................... 713/2, 1
See application file for complete search history.

(56) References Cited

U.S. PATENT DOCUMENTS

| | | | | |
|---|---|---|---|---|
| 6,434,696 B1* | 8/2002 | Kang | ................. | 713/2 |
| 6,550,021 B1* | 4/2003 | Dalphy et al. | ................. | 714/11 |
| 6,948,165 B1 | 9/2005 | Luu et al. | | |
| 7,188,237 B2 | 3/2007 | Zhou et al. | | |
| 7,444,621 B2* | 10/2008 | Pletcher et al. | ................. | 717/120 |
| 7,565,517 B1* | 7/2009 | Arbon | ................. | 713/1 |
| 7,657,732 B2* | 2/2010 | Han | ................. | 713/2 |
| 7,725,701 B2* | 5/2010 | Rios et al. | ................. | 713/1 |
| 2007/0169078 A1 | 7/2007 | Li et al. | | |
| 2008/0244167 A1* | 10/2008 | Tolmie | ................. | 711/104 |

* cited by examiner

*Primary Examiner* — Kim Huynh
*Assistant Examiner* — Eric Chang
(74) *Attorney, Agent, or Firm* — Yee & Associates, P.C.; David A. Mims, Jr.; Rudolf O. Siegesmund

(57) ABSTRACT

A computer implemented process performs a plurality of computer bootups in minimal mode. Login authentication is disabled during the computer bootups. All startup programs and services not required to install new software are disabled during the computer bootups. New software is installed during the computer bootups. During the final computer bootup, the disabled startup programs and services are enabled to restore the computer to normal operating condition.

16 Claims, 4 Drawing Sheets

MINIMAL STARTUP MODE FOR PERFORMING MULTIPLE-REBOOT CONFIGURATION

FIELD OF THE INVENTION

The invention relates generally to computer processing, and specifically to booting a computer a multiple number of times with login authentication disabled and start up programs disabled to install new software.

BACKGROUND OF THE INVENTION

Modern computing systems use software that commonly requires updating for increased functionality. Software updates are downloaded and then installed on the computer's hard drive. Complete installation often requires that the computer be rebooted. Some updates may require multiple reboots, and multiple updates often require multiple reboots. The normal rebooting process typically loads into memory start up applications and usually requires that the user login with a password. When multiple reboots are required to fully install software updates, the installation process is time consuming and requires repeated attention by the user.

When multiple, time consuming reboots are required to fully install a software update, the computer user may delay rebooting the computer until a more convenient time for the user. However, when multiple reboots are required for full installation, the computer software will remain non-updated and insecure until the multiple reboots occur. Further, a partial installation without a reboot may create conflicts and instability in the computer software.

Some computer software, such as Microsoft Windows®, offer the user an option to reboot the computer in a minimal mode. A minimal reboot is a faster way to reboot the computer because the user can disable various aspects of the software such as start-up applications. However, a minimal reboot as currently known in the prior art still suffers from a number of limitations. First, a minimal reboot does not offer the option to disable the login authentication requirement. Second, when installation of a software update requires multiple reboots, the user typically must manually reboot the computer each time, enter a user password, and then wait for each minimal bootup to complete before starting another bootup. This prior art process is not an efficient way to perform multiple reboots because the user must manually start each bootup, select available options for a minimal bootup, monitor the bootup process to enter a password, determine when each minimal reboot is complete, and then manually start the bootup process again. Finally, when multiple minimal reboots are completed, the user must reboot the computer a final time in normal mode to bring the system back to the expected normal boot up state with all start up applications and systems running.

A need exists for a computer program that performs multiple reboots, that disables login authentication and startup program and services initialization during the reboots, that leaves detection/configuration startups active if the next update step requires network access for downloads, that installs software, and that re-enables the disabled features following the last configuration step after the last reboot to bring the system back to the normal bootup state. A need also exists for an efficient application programming interface that provides selectable options for performing multiple reboots, for disabling login authentication and startup program initialization, for leaving detection/configuration startups active if the next update step requires network access for downloads, and for enabling the disabled features following the last configuration step after the last reboot to bring the system back to the normal bootup state.

SUMMARY OF THE INVENTION

A computer implemented process performs a plurality of computer bootups. Login authentication is disabled during the computer bootups. All startup programs not required to install new software are disabled during the computer bootups. New software is installed during the computer bootups. During the final computer bootup, the disabled startup programs are enabled to restore the computer to normal operating condition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Minimal Bootup Program." The term "Bootup" refers generally to the process of starting or restarting a computer wherein an operating system is loaded into the computer's main memory or random access memory to enable a user to run applications on the computer.

Figure 1:
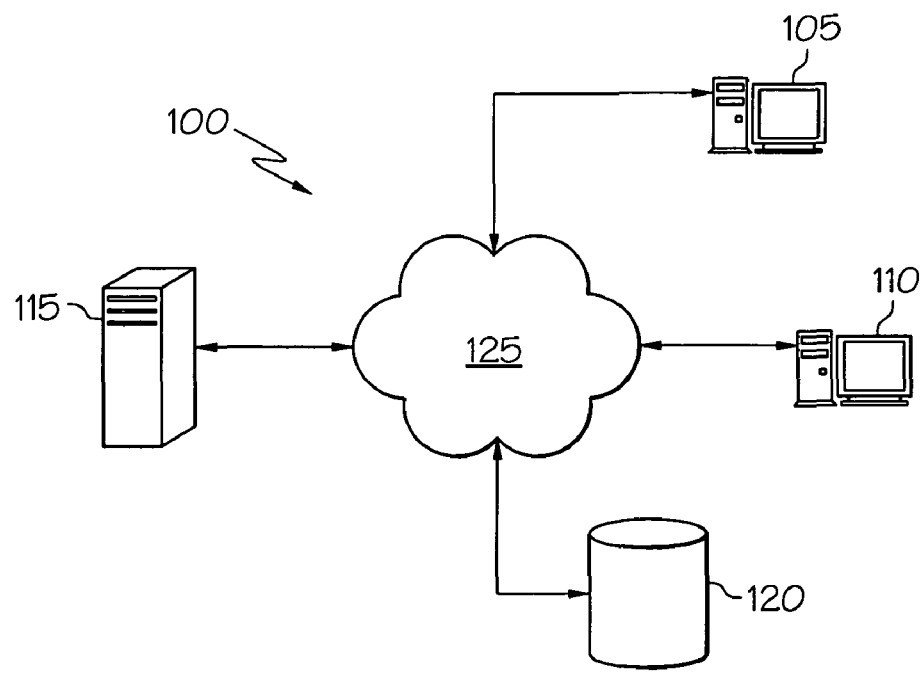
FIG. 1 depicts an exemplary computer network.

Additionally, the Minimal Bootup Program is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
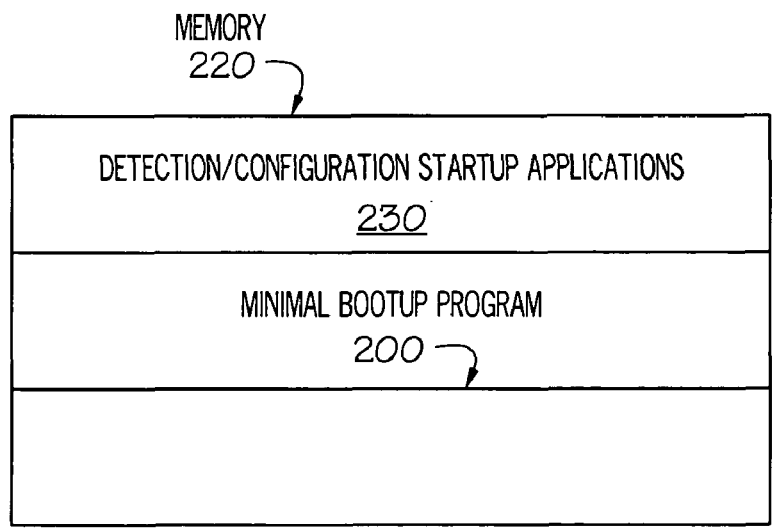
FIG. 2 depicts exemplary programs in a memory on a computer.

Minimal Bootup Program 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 220. As depicted in FIG. 2, though, memory 220 may include additional data and programs. Of particular import to Minimal Bootup Program 200, memory 220 may include detection/configuration startup applications 230 needed to download software with which Minimal Bootup Program 200 interacts.

Figure 3:
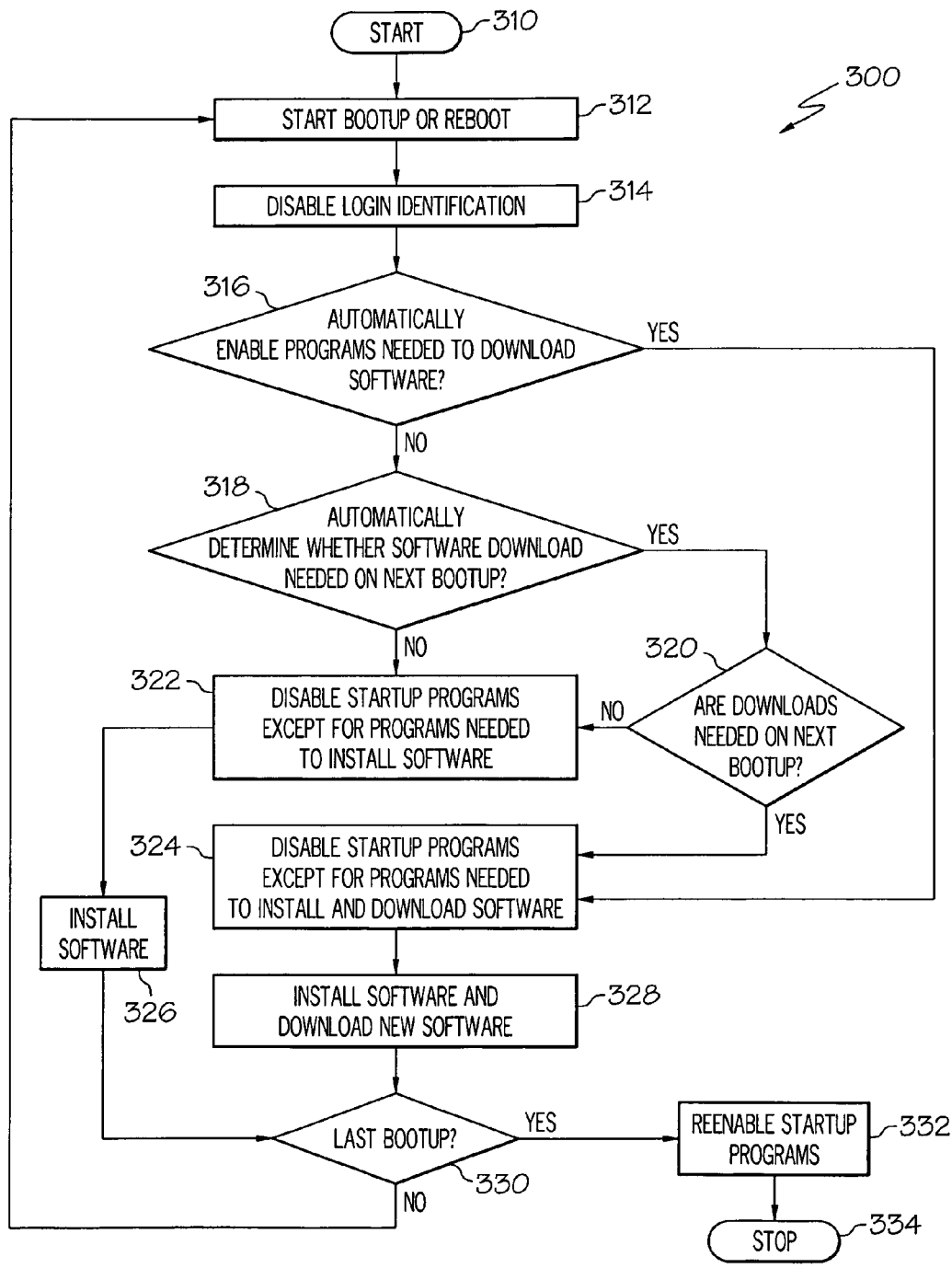
FIG. 3 depicts a flowchart of a Minimal Bootup Program.

FIG. 3 depicts a flow chart of Minimal Bootup Program 300. Minimal Bootup Program 300 starts (310) and the computer boots up or reboots (312). Minimal Bootup Program 300 can be configured to begin when the computer is powered on, in which case Minimal Bootup Program 300 will begin with a boot up. Minimal Bootup Program 300 also can be configured to begin when the computer is already booted up, in which case Minimal Bootup Program 300 will begin with a reboot. Minimal Bootup Program 300 then disables login identification (314) which eliminates the need for user login with a password or other identification. Minimal Bootup Program 300 then proceeds to step (316). If the feature that automatically starts programs needed to download software (316) is enabled, then Minimal Bootup Program 300 disables startup programs except startup programs needed to install software and download new software (324). Minimal Bootup Program 300 then installs software and downloads new software (328). If the feature that automatically starts programs needed to download software (316) is disabled, then Minimal Bootup Program 300 proceeds to step (318). If the feature that automatically determines whether software needs to be downloaded after the next bootup is enabled, then Minimal Bootup Program 300 automatically determines whether software needs to be downloaded after the next bootup (318). If software is required to be downloaded after the next bootup, then Minimal Bootup Program 300 disables startup programs except for startup programs required to install software and download software (324). Minimal Bootup Program 300 then installs software and downloads new software (328). If software is not required to be downloaded after the next bootup, then Minimal Bootup Program 300 disables startup programs except for startup programs required to install software (322) and installs software (326). After Minimal Bootup Program 300 executes step (326) or (328), Minimal Bootup Program 300 then determines whether the current bootup cycle is the last bootup required to install new software (330). If not, Minimal Bootup Program 300 reboots the computer (312) and repeats the minimal bootup cycle. If yes, then Minimal Bootup Program 300 re-enables startup programs and services to restore the computer to a normal operating condition (332) and stops (334).

Figure 4:
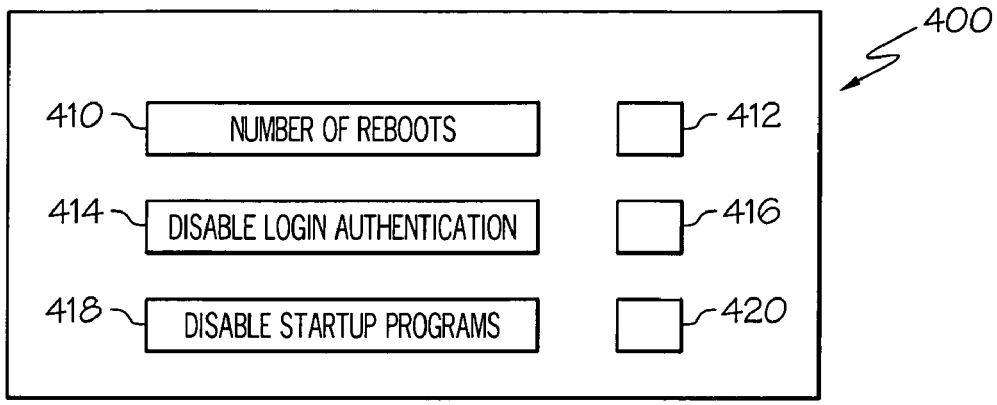
FIG. 4 depicts a graphical user interface.

FIG. 4 depicts graphical user interface 400. Graphical user interface 400 includes the statement "Number of Reboots:" 410 followed by entry box 412 where a user may enter the number of reboots desired. Graphical user interface 400 also includes the statement "Disable Login Authentication" 414 followed by entry box 416 where a user may select the option of disabling the login authentication. Graphical user interface 400 also includes the statement "Disable Startup Programs" 418 followed by entry box 420 where a user may select the option of disabling the startup programs.

Figure 5:
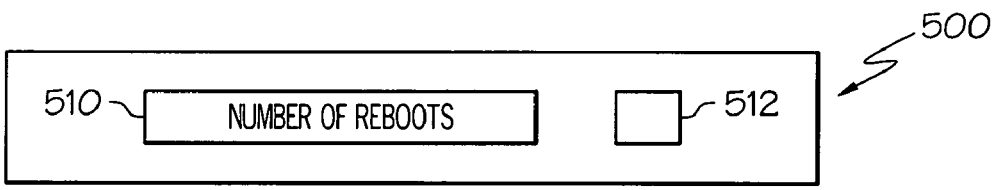
FIG. 5 depicts an alternative graphical user interface.

FIG. 5 depicts alternative graphical user interface 500. Graphical user interface 500 includes the statement "Number of Reboots:" 510 followed by entry box 512 where a user may enter the number of reboots desired.

Figure 6:
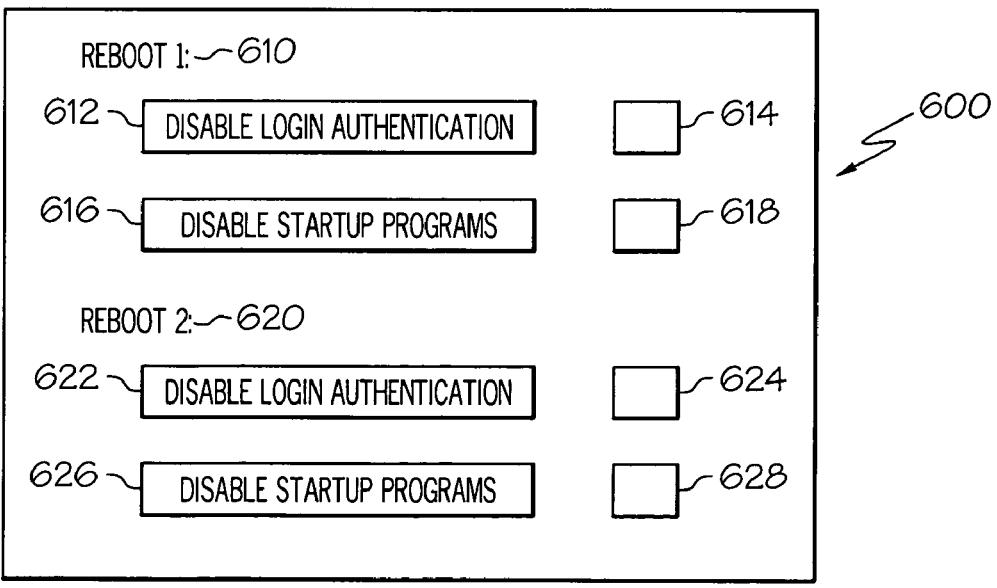
FIG. 6 depicts an alternative graphical user interface.

FIG. 6 depicts alternative graphical user interface 600. Graphical user interface 600 includes the number of reboots entered by the user in entry box 512 in interface 500. In the example provided in interface 600, the user selected 2 reboots in entry box 512 in interface 500. The example is for illustrative purposes only and the user could have selected a number of reboots greater than one. The example graphical user interface 600 includes the statement "REBOOT 1:" 610. Underneath the statement "REBOOT 1:" 610 is the statement "Disable Login Authentication" 612 followed by checkbox 614 where a user may select the option of disabling the login authentication for reboot 1. Underneath the statement "Disable Login Authentication" 612 is the statement "Disable Startup Programs" 616 followed by checkbox 618 where a user may select the option of disabling the startup programs in reboot 1. Underneath the statement "Disable Startup Programs" 616 is the statement "REBOOT 2:" 620. Underneath the statement "REBOOT 2:" 620 is the statement "Disable Login Authentication" 622 followed by checkbox 624 where a user may select the option of disabling the login authentication for reboot 2. Underneath the statement "Disable Login Authentication" 622 is the statement "Disable Startup Programs" 626 followed by checkbox 628 where a user may select the option of disabling the startup programs in reboot 2.

Figure 7:
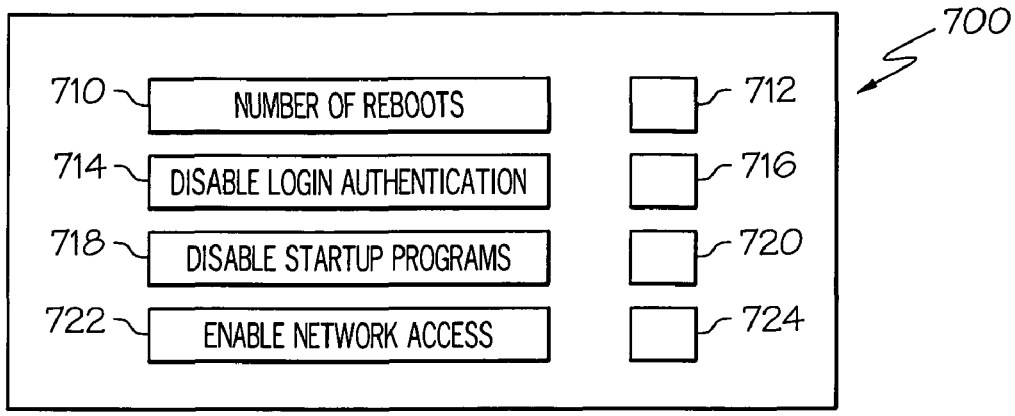
FIG. 7 depicts an alternative graphical user interface.

FIG. 7 depicts alternative graphical user interface 700. Graphical user interface 700 is identical to graphical user interface 400 depicted in FIG. 4 except that graphical user interface 700 also includes the statement "Enable Network Access" 722 followed by check box 724 where a user may select to enable network access during the multiple reboots.

Figure 8:
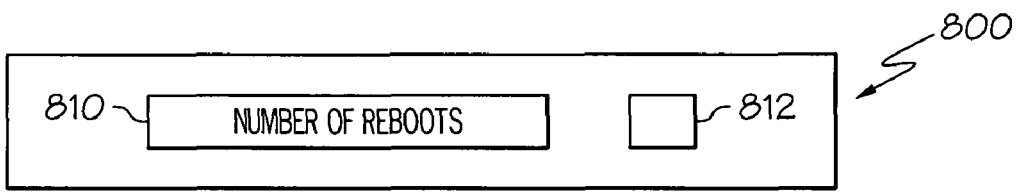
FIG. 8 depicts an alternative graphical user interface.

FIG. 8 depicts alternative graphical user interface 800. Graphical user interface 800 includes the statement "Number of Reboots:" 810 followed by entry box 812 where a user may enter the number of reboots desired.

Figure 9:
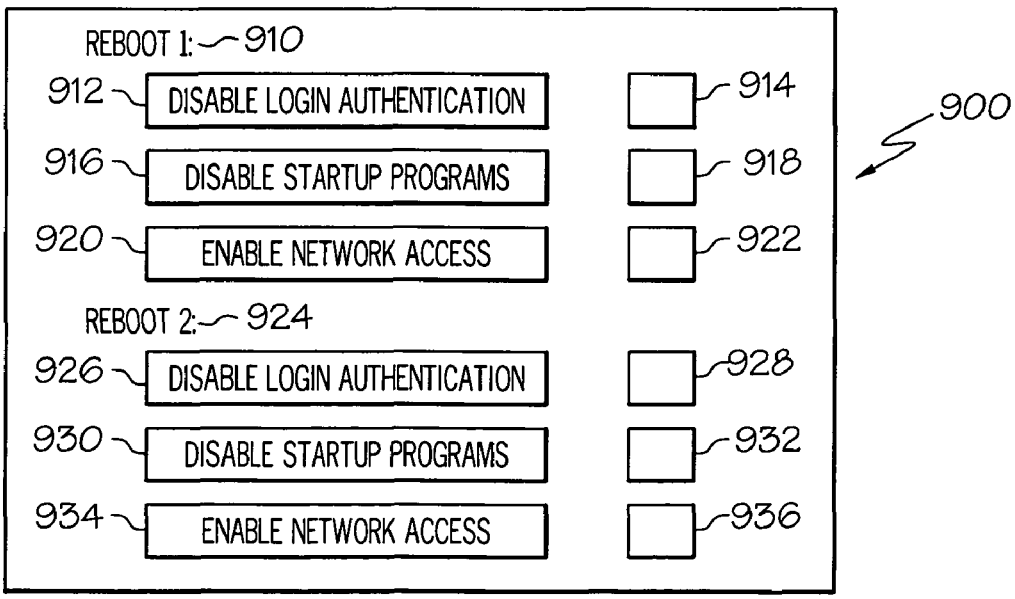
FIG. 9 depicts an alternative graphical user interface.

FIG. 9 depicts alternative graphical user interface 900. Graphical user interface 900 is identical to graphical user interface 600 depicted in FIG. 6 except that graphical user interface 900 also includes the statements "Enable Network Access" 920 and 934 followed by check boxes 922 and 936 where a user may select to enable network access during reboot 1 and/or reboot 2.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented process for automatically performing a plurality of computer bootups, the computer implemented process comprising:
   configuring a computer by entering a number of reboots, activating instructions to disable login authentication for the number of reboots and activating instructions to disable startup programs not required to install new software during the number of reboots;
   responsive to entering the number of reboots and activating the instructions to disable login authentications during the number of reboots and activating instructions to disable startup programs not required to install new software during the number of reboots, the computer installing the new software with the login authentications disabled and the startup programs not required to install the new software disabled; and
   responsive to the plurality of computer bootups equaling the number of reboots, restoring the computer to a normal operating condition that includes re-enabling the login authentication and the startup programs not required to install the new software.

2. The computer implemented process of claim 1 further comprising:
   the computer automatically enabling detection/configuration startup applications during the plurality of bootups to provide access to downloads needed for new software installation.

3. The computer implemented process of claim 2 further comprising:
   the computer automatically enabling detection/configuration startup applications during the plurality of bootups to provide access to downloads needed for installing the new software.

4. The computer implemented process of claim 1 further comprising:
   the computer automatically determining whether detection/configuration startup applications are needed to provide access for downloads during a next bootup and automatically enabling all needed detection/configuration startup applications during the next bootup.

5. A computer system for performing a plurality of computer bootups, the computer system comprising:
   one or more processors, one or more computer readable memories, and one or more computer readable, tangible storage devices;
   program instructions stored on the one or more computer readable, tangible storage devices for execution by the one or more processors via the one or more computer readable memories for configuring a computer by entering a number of reboots, activating instructions to disable login authentication for the number of reboots and activating instructions to disable startup programs not required to install new software during the number of reboots;
   program instructions stored on the one or more computer readable, tangible storage devices for execution by the one or more processors via the one or more computer readable memories for, responsive to entering the number of reboots and activating the instructions to disable login authentications during the number of reboots and activating instructions to disable startup programs not required to install new software during the number of reboots, installing the new software with the login authentications disabled and the startup programs not required to install the new software disabled; and
   program instructions stored on the one or more computer readable, tangible storage devices for execution by the one or more processors via the one or more computer readable memories for, responsive to the plurality of computer bootups equaling the number of reboots, restoring the computer to a normal operating condition that includes re-enabling the login authentication and the startup programs not required to install the new software.

6. The computer system of claim 5 further comprising:
   program instructions stored on the one or more computer readable, tangible storage devices for execution by the one or more processors via the one or more computer readable memories for opening a graphical interface for entering a desired number of computer bootups and booting the computer a plurality of times in accordance with the desired number of computer bootups.

7. The computer system of claim 5 further comprising:
   program instructions stored on the one or more computer readable, tangible storage devices for execution by the one or more processors via the one or more computer readable memories for opening a graphical user interface for selecting an option to leave detection/configuration startup applications active to provide network access for downloads during one or more of the computer bootups and enabling detection/configuration startup applications during the computer bootups as selected by the user.

8. A computer program product for causing a computer to perform a plurality of computer bootups, the computer program product comprising:
   one or more computer readable, tangible storage devices;
   program instructions stored on the one or more computer readable, tangible storage devices for configuring a computer by entering a number of reboots, activating instructions to disable login authentication for the number of reboots and activating instructions to disable startup programs not required to install new software during the number of reboots;
   program instructions stored on the one or more computer readable, tangible storage devices for, responsive to entering the number of reboots and activating the instructions to disable login authentications during the number of reboots and activating instructions to disable startup programs not required to install new software during the number of reboots, installing the new software with the login authentications disabled and the startup programs not required to install the new software disabled; and
   program instructions stored on the one or more computer readable, tangible storage devices for, responsive to the plurality of computer bootups equaling the number of reboots, restoring the computer to a normal operating condition that includes re-enabling the login authentication and the startup programs not required to install the new software.

9. A computer program product of claim 8 further comprising: program instructions stored on the one or more computer readable, tangible storage devices for enabling detection/configuration startup applications during the plurality of bootups to provide access for downloads needed for new software installation.

10. A computer program product of claim 9 further comprising: program instructions stored on the one or more computer readable, tangible storage devices for determining the number of reboots needed for software installation.

11. A computer program product of claim 8 further comprising: program instructions stored on the one or more computer readable, tangible storage devices for determining the number of reboots.

12. A computer program product of claim 10 further comprising: program instructions stored on the one or more computer readable, tangible storage devices for determining whether detection/configuration startup applications are needed to provide access for downloads during a next bootup and automatically enabling all needed detection/configuration startup applications during the next bootup.

13. A computer program product of claim 10 further comprising: program instructions stored on the one or more computer readable, tangible storage devices for automatically determining whether detection/configuration startup applications are needed to provide access for downloads during a next bootup and enables all needed detection/configuration startup applications during the next bootup.

14. A computer program product of claim 8 further comprising: program instructions stored on the one or more computer readable, tangible storage devices for opening a graphical user interface for selecting an option to disable login authentication, for selecting an option to disable startup program initialization, and for entering a desired number of computer bootups.

15. A computer program product of claim 14 further comprising: program instructions stored on the one or more computer readable, tangible storage devices for opening a graphical user interface for selecting an option for leaving detection/configuration startup applications active to provide network access for downloads during one or more of the computer bootups.

16. A computer program product of claim 8 further comprising: program instructions stored on the one or more computer readable, tangible storage devices for opening a graphical user interface for selecting an option for leaving detection/configuration startup applications active to provide network access for downloads during one or more of the computer bootups.

* * * * *